United States Patent
Döhring et al.

(10) Patent No.: US 10,119,709 B2
(45) Date of Patent: Nov. 6, 2018

(54) HEATABLE COVERING SYSTEM

(75) Inventors: Dieter Döhring, Zabeltitz (DE); David Macher, Voitsberg (AT); Gerhard Kremer, Fürstenfeld (AT)

(73) Assignee: Kronoplus Technical AG, Niederteufen (CH)

( * ) Notice: Subject to any disclaimer, the term of this patent is extended or adjusted under 35 U.S.C. 154(b) by 1931 days.

(21) Appl. No.: 12/991,829

(22) PCT Filed: May 11, 2009

(86) PCT No.: PCT/EP2009/003328
§ 371 (c)(1),
(2), (4) Date: Jul. 29, 2011

(87) PCT Pub. No.: WO2009/135690
PCT Pub. Date: Nov. 12, 2009

(65) Prior Publication Data
US 2011/0272392 A1 Nov. 10, 2011

(30) Foreign Application Priority Data

May 9, 2008 (EP) ..................... 08008760

(51) Int. Cl.
*H05B 1/00* (2006.01)
*F24D 13/02* (2006.01)
(Continued)

(52) U.S. Cl.
CPC ........... *F24D 13/024* (2013.01); *H05B 3/145* (2013.01); *H05B 3/20* (2013.01); *H05B 2214/04* (2013.01); *Y02B 30/26* (2013.01); *Y10T 29/49002* (2015.01)

(58) Field of Classification Search
CPC ................ F24D 13/024; H01L 21/67248
(Continued)

(56) References Cited

U.S. PATENT DOCUMENTS 3,265,858 A * 8/1966 MacGuire .................. 392/435
3,346,958 A * 10/1967 Sinatra et al. ................ 433/99
(Continued)

FOREIGN PATENT DOCUMENTS

| CN | 2480750 Y | 3/2002 |
| CN | 1590671 A | 3/2005 |

(Continued)

OTHER PUBLICATIONS

International Search Report for corresponding application No. PCT/EP2009/003328 dated Jul. 22, 2009.
(Continued)

*Primary Examiner* — Jimmy Chou
(74) *Attorney, Agent, or Firm* — Renner, Otto, Boisselle & Sklar, LLP

(57) ABSTRACT

The present invention relates to a heatable covering system for floors, ceilings and walls and to a method producing a heatable covering system. The covering system comprises covering panels which comprise at least on one longitudinal edge coupling means in order to be able to join covering panels with each other, wherein the covering panels are provided with electric heating means, built by at least one electrical conductive layer and a therein embedded enforcement layer, and which comprise electric contacting means.

22 Claims, 6 Drawing Sheets

(51) Int. Cl.
*H05B 3/14* (2006.01)
*H05B 3/20* (2006.01)

(58) Field of Classification Search
USPC ....... 219/213, 494, 552, 538, 540, 547, 553; 392/311, 313, 314, 318, 432, 435, 436, 392/437, 438, 439
See application file for complete search history.

(56) References Cited

U.S. PATENT DOCUMENTS

| | | | | |
|---|---|---|---|---|
| 3,417,229 A | * | 12/1968 | Shomphe et al. | 219/528 |
| 3,603,764 A | * | 9/1971 | Martin | 219/213 |
| 3,657,516 A | * | 4/1972 | Fujihara | 392/435 |
| 3,659,077 A | * | 4/1972 | Olson | H05B 3/00 |
| | | | | 219/213 |
| 3,676,641 A | * | 7/1972 | Olson | 219/200 |
| 3,697,728 A | * | 10/1972 | Stirzenbecher | 219/548 |
| 3,798,111 A | * | 3/1974 | Lane et al. | B41M 1/36 |
| | | | | 156/148 |
| 3,858,144 A | * | 12/1974 | Bedard et al. | 338/22 R |
| 4,115,917 A | | 9/1978 | Charon et al. | |
| 4,301,356 A | * | 11/1981 | Tanei et al. | 219/213 |
| 4,310,745 A | * | 1/1982 | Bender | H05B 3/10 |
| | | | | 219/213 |
| 4,374,312 A | * | 2/1983 | Damron | 392/435 |
| 4,429,214 A | * | 1/1984 | Brindley et al. | 392/435 |
| 4,542,282 A | * | 9/1985 | Brasky | 392/435 |
| 4,564,745 A | * | 1/1986 | Deschenes | 219/213 |
| 4,616,125 A | * | 10/1986 | Oppitz | 219/553 |
| 4,764,664 A | * | 8/1988 | Kamath et al. | 219/548 |
| 4,814,580 A | * | 3/1989 | Carageorge | 219/213 |
| 4,967,057 A | * | 10/1990 | Bayless et al. | 219/213 |
| 5,380,988 A | * | 1/1995 | Dyer | 219/548 |
| 5,550,350 A | * | 8/1996 | Barnes | 219/213 |
| 5,908,584 A | * | 6/1999 | Bennett | 252/502 |
| 5,916,469 A | * | 6/1999 | Scoles et al. | 219/633 |
| 6,015,965 A | * | 1/2000 | Miller et al. | 219/213 |
| 6,188,839 B1 | * | 2/2001 | Pennella | 392/435 |
| 6,440,538 B1 | * | 8/2002 | Ungar | B32B 27/04 |
| | | | | 428/143 |
| 6,611,659 B2 | * | 8/2003 | Meisiek | 392/435 |
| 6,621,983 B2 | * | 9/2003 | Thorin | 392/435 |
| 6,737,611 B2 | * | 5/2004 | Ek et al. | 219/213 |
| 6,855,915 B2 | * | 2/2005 | Gehring | 219/213 |
| 6,888,147 B1 | * | 5/2005 | Hansson | B32B 5/30 |
| | | | | 156/219 |
| 7,196,288 B2 | * | 3/2007 | Weiss et al. | 219/217 |
| 7,441,384 B2 | * | 10/2008 | Miller | E04F 15/04 |
| | | | | 52/589.1 |
| 7,935,911 B2 | * | 5/2011 | Kaesler | 219/201 |
| 8,039,774 B2 | * | 10/2011 | Dubey | 219/213 |
| 8,076,613 B2 | * | 12/2011 | Raidt et al. | 219/213 |
| 8,288,689 B1 | * | 10/2012 | Adelman | 219/213 |
| 8,306,408 B2 | * | 11/2012 | Abbott | 392/407 |
| 8,383,993 B2 | * | 2/2013 | Kim et al. | 219/494 |
| 2002/0136543 A1 | * | 9/2002 | Thorin | 392/435 |
| 2003/0052114 A1 | * | 3/2003 | Ek et al. | 219/213 |
| 2004/0175163 A1 | * | 9/2004 | Fukai et al. | 392/435 |
| 2004/0245234 A1 | * | 12/2004 | Gehring | 219/213 |
| 2006/0144004 A1 | * | 7/2006 | Nollet | B44C 1/24 |
| | | | | 52/578 |
| 2006/0162271 A1 | * | 7/2006 | Eisermann | E04F 15/02 |
| | | | | 52/589.1 |
| 2006/0272796 A1 | * | 12/2006 | Asmussen et al. | 165/53 |
| 2007/0023417 A1 | * | 2/2007 | Keane | 219/494 |
| 2007/0107839 A1 | * | 5/2007 | Sjoberg | B32B 21/02 |
| | | | | 156/307.7 |
| 2008/0138560 A1 | * | 6/2008 | Windmoller | B32B 3/02 |
| | | | | 428/46 |
| 2008/0199666 A1 | * | 8/2008 | Price | D06M 15/263 |
| | | | | 428/211.1 |
| 2008/0210679 A1 | * | 9/2008 | Raidt et al. | 219/213 |
| 2009/0031662 A1 | * | 2/2009 | Chen | C04B 26/08 |
| | | | | 52/515 |
| 2009/0078129 A1 | * | 3/2009 | Cappelle | B44B 5/026 |
| | | | | 100/35 |
| 2009/0200285 A1 | * | 8/2009 | Raidt et al. | 219/213 |

FOREIGN PATENT DOCUMENTS

| | | | |
|---|---|---|---|
| DE | 32 08 428 A1 | 9/1983 | |
| DE | 100 52 345 | 5/2002 | |
| DE | 202007008360 U1 * | 8/2007 | ............ B32B 27/04 |
| EP | 0231913 | 8/1987 | |
| EP | 1 429 080 A1 | 6/2004 | |
| FR | 2681753 | 3/1993 | |
| WO | 02/31290 | 4/2002 | |
| WO | 2004/065322 | 8/2004 | |
| WO | 2004/099530 | 11/2004 | |
| WO | 2006/103081 | 10/2006 | |
| WO | 2008/055535 | 5/2008 | |

OTHER PUBLICATIONS

Office Action for corresponding European Application No. 08 008 760.4 dated Nov. 8, 2013.

* cited by examiner

HEATABLE COVERING SYSTEM

The present invention relates to a heatable covering system for floors, ceilings and walls and to a method for producing such a covering system.

For heating of floor surfaces, different methods are known from the prior art. A popular floor heating consists of a number of pipes or tubes, which are arranged meander-shaped across a floor and through which a heating fluid, usually hot water, streams. Onto these heating pipes or tubes, the real floor cover, for example, a parquet or tile floor, is laid and which is heated by means of the hot pipes.

Floor heatings are panel heatings which allow a uniform and therewith comfortable heat distribution. However, conventional floor heatings, like the above described, are expensive with respect to material costs and also with respect to its installation and which normally can be only installed by accordingly trained experts.

From the European patent EP 105 5 087 B1, a heatable covering system for floors is known, which consists of a number of metal plates in which channels are incorporated. The metal plates are laid on a floor in such a manner that the channels are connected with each other. Then, into these channels a heating cable is meander-shaped inserted. The heating cable is self-adjusting and provided with an integrated thermal protection in order to eliminate the risk of excessive heating. Onto the metal plates and the heating cable which is arranged in the channels within the plates, then, a usual floor cover, for example ceramic tiles, can be laid.

From the U.S. Pat. No. 6,737,611 B2, an electrical conducting thermoplastic mat is known, which heats itself while applying a potential. The mat consists of a semi-crystalline polymeric and an electrical conducting fill material and due to its small thickness can be laid below a floor cover. The heat mat is flexible and is offered in a rolled-up condition. During laying the heat mat, it has only to be unrolled above a floor and accordingly fixed and electrically connected.

The present invention is a further development of the subject-matter of the international patent application with the file number PCT/EP2006/010822. From this, a heatable covering system for floors, ceilings and walls is known, comprising covering panels on which electric heating means are provided. As electric heating means, in particular an electrical conductive layer is disclosed which is applied onto the covering panels as liquid and which is dryable after applying onto the covering panels.

With respect to such covering panels, it has been shown that the electrical conductive layer tends to crack formation, what can not only have a negative affect on the optic, and thus on the customer acceptance of such a covering panel, but what can also have a negative affect on the reliability of the electric heating means itself, since due to strong crack formation, the electrical conductivity and therewith the heat output could be affected.

Moreover, it has been shown that from a certain layer thickness, the electric conductive layer can increasingly tend to crack formation.

One object of the present invention is to provide an improved heatable covering system for floors, ceiling and walls, wherein the covering panels are provided with electrical heating means comprising an electrical conductive fluid which dried or hardened builds the electrical conductive layer on the covering panels. In particular, by means of an inventive covering system, the crack formation should be prevented, but at least reduced. Furthermore, a method for producing an inventive covering system should be provided.

These and other objects, which during reading the following description will be named or can be recognized by a person skilled in the art, are solved by means of a heatable covering system according to claim 1 and with a method for producing a heatable covering system according to claim 14.

In one embodiment, the heatable covering system for floors, ceilings and walls, comprises covering panels with a decorative top side and a bottom side, for example laminate floor panels. In this case, the covering panels are provided with coupling means at least on one longitudinal edge in order to be able to join covering panels with each other. The coupling means are preferably provided in such a way that they provide a latching which prevents a separation of the connection with respect to a parallel direction to the laying plane. The covering panels are provided with electric heating means, wherein the electric heating means preferably provide a panel heating means. The covering panels have suitable configured electric contacting means in order to allow an electric connection between the electric heating means of two or more covering panels. Preferably, the electric heating means are arranged at the bottom side of the covering panels, i.e. in the space between the covering panels and the floor or the wall which should be covered with the panels.

According to the invention, the electric heating means comprises at least an electrical conductive layer consisting of a dried or hardened fluid and an enforcement layer which is at least partially embedded in the electrical conductive layer. Preferably, at first, the fluid is applied or brought up onto the covering panel and afterwards, the enforcement layer is applied onto the still wet conductive layer so that the fluid penetrates at least partially the enforcement layer and thus, when dried a compound between the enforcement layer and conductive layer is provided.

The enforcement layer is preferably built of a fleece, paper, web, meshwork or a combination thereof. Essential is that the enforcement layer has a certain suction or osmosis effect with respect to the fluid building the electrical conductive layer and therefore, an at least partially embedding of the enforcement layer in the electrical conductive layer can be provided, if it is, for example, applied onto the still wet conductive layer.

It was surprisingly found out that by the embedding of the enforcement layer in the electrical conductive layer, no essential affect on the electrical conductivity of the electrical conductive layer occurs. This can possibly be explained in that the enforcement layer by means of the suction or osmosis effect preferably absorbs water and not the solid bodies of the fluid providing the electrical conductivity. Thereby, that the enforcement layer preferably absorbs moisture (osmosis, capillarity), an increasing density (distribution gradient) results with respect to the covering panel of the conductive solid compounds of the fluid, which preferably stay at the covering panel, more precisely between the covering panel and the enforcement layer, and which do not penetrate into the enforcement layer. Thus, with this proceeding one can say that the enforcement layer is only partially embedded in the electrical conductive layer.

Furthermore, it was not to expect that by the present suggested embedding of an enforcement layer, a material can be provided which has an excellent uniformity of the electrical conductivity over the entire surface. For a uniform heating output over the surface, it is particularly necessary that the conductive layer is very uniform and as failure-free as possible applied, dried and hardened. This surprising effect could possibly be explained by the fact that by means of the suggested embedding of the enforcement layer a good flatness of the initially liquid layer is received or will be received.

In an alternative embodiment, the heating means can also be provided by that the enforcement layer is sprinkled with an appropriate liquid and the sprinkled enforcement layer is applied onto the covering panel. However, this proceeding does not provide the above-mentioned particular advantages.

In order to support this effect further, for example, materials with lower pore size, in which preferably water enters, can be used for the enforcement layer. For example, also materials at which the electrical conductive materials "adhere" very well can be provided in the fluid building the electrical conductive layer and wherein these materials at which the electrical conductive materials "adhere" very well have to be chosen big enough that these can not immigrate into the enforcement layer.

Furthermore, the enforcement layer itself can be sprinkled with a fluid before applying it onto the electrical conductive layer, for example, in order to be able to control or affect the embedding. In case, the enforcement layer is pre-wetted, the occurring suction or osmosis effect is less. Thereby, it is particularly possible, for example, to use thicker enforcement layers which without pre-wetting have a too big suction or osmosis effect.

Thereby, the enforcement layer itself can be provided as electrical conductive or it can be sprinkled with a hardenable fluid which again comprises conductive compounds or the like. In this case, an electrical parallel connection of the enforcement and the electrical conductive layer results.

By the fact that the embedded enforcement layer interlinks with the electrical conductive layer, it absorbs possible tensile forces occurring in the electrical conductive layer and prevents or at least reduces a crack formation in the electrical conductive layer. Moreover, the enforcement layer provides the general advantage that it allows the use of particular thick electrical conductive layers.

In a preferred embodiment, the enforcement layer is embedded in the entire extension of the electrical conductive layer, particularly, also in the edge areas of the covering panels where preferably the electric contacting means are arranged so that thereby also a crack formation in the particularly exposed transitional area to the electric contacting means is prevented. Therefore, it is generally advantageous that the enforcement layer covers the transitional area to the contacting means.

The covering panels are preferably laminate, veneer or parquet panels. Such covering panels are preferably used as flooring and are commercially available in a variety of embodiments, qualities and sizes.

As already mentioned, in a preferred embodiment, the electric contacting means are arranged at the edge area, at least partially at the mechanic coupling means of the covering panels so that by joining of respective mechanic coupling means of two covering panels also an electric connection between the electric heating means of these covering panels can be provided and thus, to provide a simple as possible electrical connection between two covering panels.

In a preferred embodiment, the coupling means are provided as groove and tongue elements, which are provided complementary to each other so that a tongue can be inserted with its longitudinal edge of a first cover panel in a respectively provided groove at a longitudinal edge of a second cover panel. In order to be able to connect several cover panels with each other, the coupling means are preferably provided at least on two opposite longitudinal sides of the covering panels, wherein particularly always a groove lies opposite to a tongue. The coupling means preferably extend over the full length of a longitudinal side.

In order to achieve a good electric contact, the electric contacting means preferably extend over substantially the full length of the coupling means, i.e. more than at least 60%, preferably at least 75%, most preferably 90% of the length of the coupling means. In this manner, it is possible to cut the covering panel to any length in order to adopt them to the special lay-requirements without that the electric contactability is lost.

The contacting means consists, for example, of stripe-shaped electrical conducting elements. For example, they can consist of an electrical conducting metal foil, which consists of, for example, copper, aluminium or high-grade steel. In a further exemplary embodiment, the electrical conducting foil consists of tinned copper strip.

For mounting the contacting means onto the coupling means, for example, these can be pressed and/or glued on the coupling means. The applied adhesive material is preferably electrically conductive. In case, the contacting means consist of strip-shaped electrical conducting elements, these are preferably pressed onto the coupling means in such a manner that they are fixed at the coupling means by means of a tight fit. In case the coupling means are made of complementary provided groove and tongue elements, the strip-like elements can be laid respectively pressed or bonded, around the tip of the tongue. An advantageous adhesive connection can be realized, for example, by means of an adhesive tape, which preferably is adhesive on both sides. In this manner, it is possible to make the adhesive bonding of the contacting means on the coupling means easier, for example by applying the adhesive tape at first on the contact means, for example an electrical conducting metal foil and then by arranging and gluing the compound consisting of contacting means and adhesive tape on the coupling means. Of course, here it is also possible to press the contacting means additionally with the coupling means in order to achieve a even better conjunction between contacting means and coupling means.

In a particular advantageous embodiment, the coupling means consist of complementary provided groove and tongue elements and the contacting means of electrical conducting metal foils. The inner sides of the lower flanks of the groove elements are thereby at least partially covered by an electrical conducting metal foil. At the tongue elements, the lower sides of the tongue elements are at least partially covered with a metal foil. In case, two covering panels with complementarily provided groove and tongue elements are mechanically connected with each other by inserting the tongue of the one covering panel into the groove of the other covering panel, in this manner simultaneously and without any additional effort, an electric connection between two covering panels is achieved. As soon as the tongue of one covering panel is inserted into the complementarily provided groove of a further covering panel, even automatically and simultaneously, the electric connection by means of the electrical conducting metal foils arranged within the groove of one panel and at least partially on the tongue of the other panel is provided.

The electric heating means for covering panels can act particularly well together with the above disclosed contacting means. However, the heating means can also act together with other common contacting means. As mentioned above, the electric heating means of the covering panels preferably provide a panel heating. This can be arranged at the top side or bottom side of the covering panels, however preferably it is arranged at the bottom side of the covering panel. If in the following the top side and bottom side of the covering panel is discussed, it should be clear that this does not necessarily mean that the electric heating means are arranged as single layer at the bottom or top side of the covering panel or that they have to be arranged directly at the bottom or top side. On the contrary, further layers, particularly décor layers and abrasion-proof layers, can be provided at the top side and layers for sound-absorption or layers for thermal insulation at the bottom side can be provided.

Beside the electrically conductive layer, the electrical panel heating could comprise electrical resistance wires or the like, which support the heating output of the electrically conductive layer. The resistance wires can be provided, for example, by means of a web made of thin conducting copper wires, which warm up during electric application.

The electrical conductive layer is preferably applied in liquid or flowable condition by means of spray coating, roller coating, doctor blade coating, screen print coating or inkjet coating or a combination of these methods.

In a preferred embodiment, the electrical conducting fluid consists of graphite lacquer or carbon lacquer. Such lacquer can be commercially obtained, for example, from the company CRC Industries GmbH, Germany. It is also, for example, possible that the fluid is provided with carbon or graphite particles in order to improve the electric conductivity and/or in order to make the fluid electrical conducting. In a further advantageous embodiment, the fluid comprises nano-scale electrical conducting particles or so called multi-walled-carbon-nano-tubes. Advantageously, the fluid comprises 5 to 60%, particularly preferred between 20 to 50% solid material. This can be the mentioned conductive components, but also filling materials and other functional materials, like flow agents or the like. The less liquid or the more solid components are present in the fluid, the less time consuming is the subsequent dry process. However, certain applications could require a higher fluid contend.

In a particularly preferred example, a fluid is used that comprises at least the following components:
   5 to 50 parts of a binder on the basis of acrylic resin which can be a aqueous dispersion,
   0.1 to 1 parts of a dispersing agent,
   5 to 50 parts of a graphite having a middle particle size of 2 to 20 µm and
   if necessary, an organic thickening agent in order to be able to adjust the viscosity.

Herein, the mixture is particularly provided in such a way that it can be filled up to 100 parts with water.

Optional, it is in general possible that the dispersion is subject of an additional grinding process, for example by means of a bead mill. Thereby, the dispersion, if required, can be additionally homogenized, in order to receive better electrical characteristics. The solid contend of the dispersion is preferably 5 to 60%, more preferred 20 to 50%.

Depending on the application, it is preferred to apply between 50 to 400 $g/m^2$ or between 100 to 300 $g/m^2$ or between 150 to 200 $g/m^2$ fluid onto the covering panels.

The energy supply should be happen with an alternating voltage less than 42 V, particularly with a voltage of 38 V. Thereby, the electrical power input is preferably not greater than 120 Watt per $m^2$. A covering system, which is provided with electric heating means, is preferably provided with an automatic temperature control. Thereby, the temperature control keeps the surface temperature of the covering panel in the range of 18° C. to 32° C.

In order to increase the effectivity of a covering system with the disclosed electric heating means, below the heating means preferably an insulating layer for insulation is arranged. The insulating layer for insulation consists, for example, of an electrically non-conducting fleece. As material for the heat-insulation layer, practically all heat-insulating materials are applicable, which are usually used for interior construction and for the laying of floorings. Thereby, also electrical conducting materials are conceivable; however, in this case they have to be electrically insulated from the heating system and from the electrical contacting means. This, for example, can be done by means of a further electrically, non-conducting layer, which is arranged between insulating layer and possibly adjacent electric contacting means or electric heating means. In an exemplary embodiment, below the heating means, an insulating layer for insulation is arranged, which consists of an electrically non-conducting, non-woven fleece, having a thickness of more then 1 mm, preferably between 1.5 to 3.5 mm.

The electrical heating should have a sheet resistance between 25 to 500 Watt per $m^2$, particularly between 60 to 120 Watt per $m^2$, particularly preferred 80 Watt per $m^2$.

In an advantageous embodiment, the bottom sides of the covering panels are provided with a sound-absorbing layer. From the field of laminate, veneer and parquet floorings, a person skilled in the art knows a number of sound-absorbing materials and laying methods for these purposes. The sound-absorbing layer can, for example, be arranged between the bottom side of the covering panel and the electrical heating layer. In an advantageous embodiment, the covering panel comprises a sound-absorbing layer and also a heat-insulating layer. Starting from the bottom side of the covering panel, the covering advantageously comprises the following layer system: a sound-absorbing layer; an electric panel heating, i.e. comprising at least one electrical conductive layer in which an enforcement layer is at least partially embedded and a heat-insulating layer.

The enforcement layer is preferably rolled-on by means of a laid-up roller without additional contact pressure, preferred at a temperature between 15 to 85° C., more preferred between 18 to 25° C. Thereby, rolling-on can be done directly after applying the fluid with a preferred speed of 10 to 250 m/min or with a particularly preferred speed of 60 to 90 m/min.

For example, to receive an electrical conductive layer, for example, 200 $g/m^2$ of an aqueous conductive dispersion, preferably with 48% solid contend, can be uniformly applied by means of a casting machine, in particular onto a panel already provided with lateral contacting strips. Onto this wet layer a paper fleece, coming from above, is laid on only by its own weight having a weight per unit area, for example, of 57 $g/m^2$, in particular with a suction lift of 95 mm (according Klemm, ISO 8787) and a preferred density of 222 $kg/m^3$. By means of the prompt absorption of the water, a uniform, full-sized support without air inclusions takes place. Advantageously, but however optional, the package runs afterwards through a mangle section which causes a slight rolling-on of the fleece. This has the advantage that the bulges, maybe occurring during the casting, in the area of the lateral contacting stripes can be good planarized. Afterwards, the package is brought to a drying which is designed so that the temperature at the running-in is preferably 40° C. and in the dryer-end-area 130° C. The dryer length is designed that the residence time is preferably 9 min. Thereby, the paper fleece is closely and irreversible compounded with the below arranged layer, however, without that the conductive solid bodies at the backside of the fleece accumulate by penetrating through.

In case, the fleece layer is removed layer by layer, the embedding and the reinforcing effect of the fleece can be recognized. For example, no cracks in the surface could optically be detected. A comparison sample, without fleece covering, wherein the drying process was identically carried out, has a significant crack formation, particularly in the area of the contacting strips, but also in the entire surface.

Surprisingly, the described embedding is sufficient in order to substantially fully prevent at least the shrinkage and tension cracks occurring during the drying process.

In the following a detailed description of the figures is provided.

Figure 1:
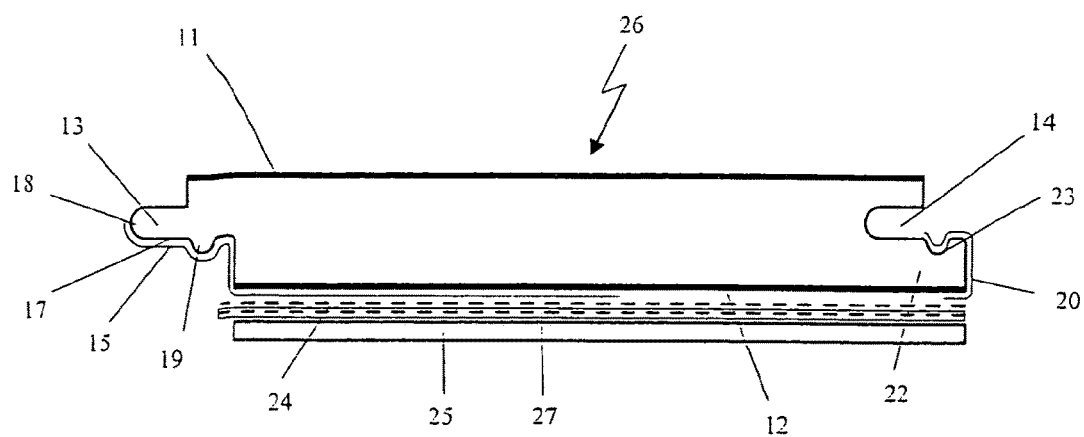
FIG. 1 shows a schematic cross-section view of a covering panel with an additional insulating layer.
Figure 2:
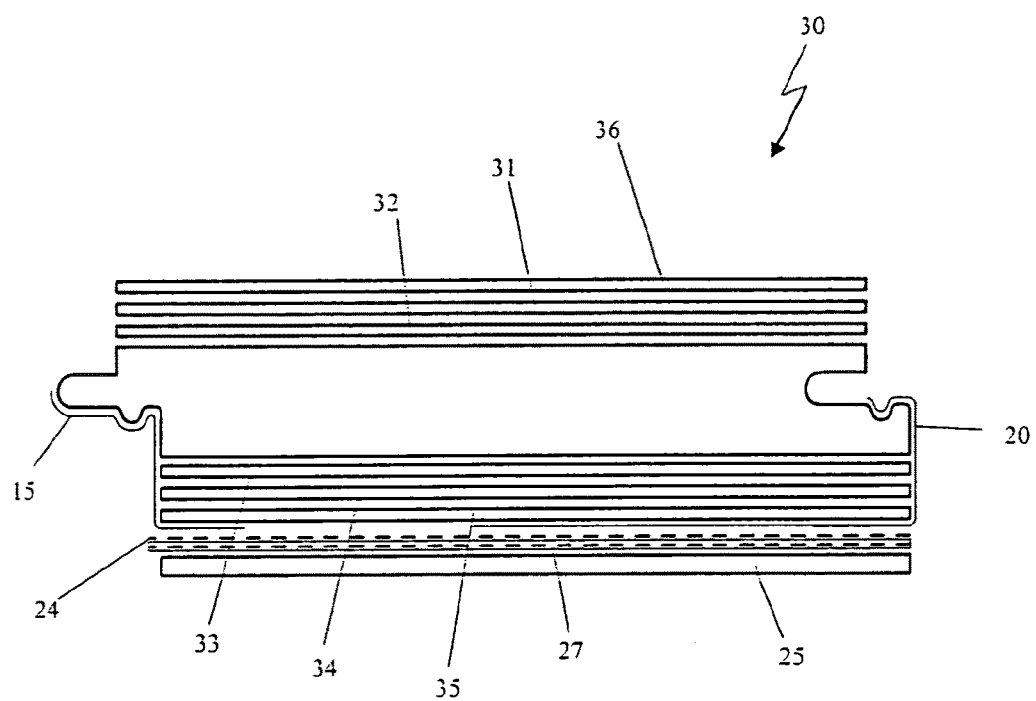
FIG. 2 shows a schematic cross-section view of a covering panel with a number of further layers.

In FIG. 1, a schematic cross-section view of an exemplary covering panel 26 is shown which is intended for use in a covering system. The exemplary covering panels 26 respectively 30 of the FIGS. 1 and 2 are laminate panels for a floor.

Such laminate panels usually have a rectangular shape, wherein both longitudinal edges are provided with groove and tongue elements. The short cross sides of such a covering panel can also be provided with similar or also with different coupling means. In this manner all four edges of the covering panels are provided with coupling means so that they can be connected in a covering system at all four sides with further covering panels in order to be able to cover a larger area. The covering panel 26 has a top side 11 and a bottom side 12. The top side 11 can be covered with further layers made of different materials. In case of a laminate panel this is usually at least a décor layer consisting of a printed special paper and an above arranged overlay layer which is particularly abrasive resistant and serves as protecting layer. At the bottom side 12 also further layers can be arranged, for example, layers for sound-absorbing or layers for heating-insulation. At both longitudinal sides of the covering panel 26 coupling means in form of tongue 18 and groove 14 are provided. Tongue and groove are complimentarily to each other provided so that in case two covering panels 26 should be joint with each other, a tongue 18 of one covering panel can be inserted in a groove 14 of one other covering panel. The shown embodiment of tongue and groove is only exemplary and there are a large number of different tongue and groove shapes known from the prior art which can also be used with the present invention.

In the embodiment shown in FIG. 1, the tongue 18 is provided with contacting means 15 in form of a thin strip of an electrically conductive material which is arranged at the bottom side of the tongue 18 and extends to the bottom side of the covering panel 26. The lower flank of the groove is provided with a further contacting means 20 that also extends to the bottom side of the covering panel 26. In the embodiment shown in FIG. 1 the contacting means covers the coupling means, i.e. the tongue and groove only partially. However, as can be clearly seen in FIG. 1, nevertheless an electric connection is provided between two covering panels, in case the tongue 15 of a covering panel is inserted in a complementary formed groove 14 of another covering panel, since in the present case at least the latching protrusion at the tongue and the latching groove at the lower flank of the groove 14 are covered by the contacting means.

The contacting means 15 is, for example, a thin strip of an electrical conducting material, for example, a thin copper strip. The strip is preferably so thin and flexible respectively that it can be curved around the shape of the tongue or the groove without big effort. The strip 15 preferably extends over the full length of the tongue, i.e. over the total length of the longitudinal side of the covering panel 26, in case the tongue extends over the total lengths. At the bottom side of the covering panel 26 an electric heating means 24 which is in contact with the contacting means 15, 20 is provided.

The tongue 18 is provided with a latching protrusion 19 at its bottom side 17 which preferably extends over the total length of the tongue and thereby over the total length of the longitudinal edge of the covering panel 26. The complimentary provided groove 14, at the opposite side of the covering panel 26, has an upper flank 21 and a lower flank 22. Within the lower flank 22 a latching groove 23 extends, preferably also over the full length of the lower flank 22. As shown in FIG. 1, the lower flank 22 is slightly longer than the upper flank 21. In this manner, the inserting of the tongue 18 into the groove 14 is easier, in case two covering panels 26 with complementary provided groove and tongue elements are joined with each other. While inserting the tongue into the groove the latching protrusion 19 is pressed in the latching groove 23 in the lower flank 22 of the groove 14 which is preferably complementary provided. In this manner, two properly provided covering panels can be joined with each other particularly secure, since a disconnection of the connection in the laying plane is prevented. Such a connection is generally applicable and preferred for all herein described embodiments according to the invention. Since, like shown, the contacting means 15 and 20 respectively are arranged at the coupling means, i.e. the tongue and also the groove, while joining two covering panels mechanically, an electrical connection between the electric contacting means 15 and 20 is automatically provided. Since the contacting means are again in electric connection with the heating means 24 arranged on top and/or bottom side of the covering panel, like in the following will be described, also an electric connection between the respective electric heating means is created in a simple manner. Therefore, no addition hand grips or tools are necessary in order to provide also the electric contact between these panels, in addition to the mechanic latching of two covering panels. Therefore, such a covering system formed as described can be laid by layman.

The electric heating means provides a panel heating and is built by an electrical conductive layer 24 (marked in dotted lines) and a therein embedded paper fleece 27. The electrical conductive layer 24 is applied as fluid and, for example, consists of graphite lacquer or carbon lacquer or a mixture thereof. The fluid building the electrical conductive layer 24 after drying, is applied onto the bottom side of the covering panel, preferably after the covering panels were provided with electric contacting means, wherein in this case, the electrical conductive layer is also applied onto the contacting means. The application of the electrical conductive layer can, for example, be done by means of a spray coating, roller coating, a doctor blade coating, a screen print coating or a inkjet coating or a combination thereof, wherein a casting coating is particularly preferred with which between 10 to 350 g/m², in particular 120 to 250 g/m² fluid is casted onto, and wherein the fluid comprises 30 to 80% solid material. In order to increase the electrical conductivity of such a fluid, it can be provided with carbon or graphite particles.

In the electrical conductive layer a paper fleece 27 building the enforcement layer is embedded. Thereby, the paper fleece 27 is rolled-on the still wet electrical conductive layer, therefore on the fluid. In the course of this, the paper fleece 27 absorbs the liquid from the fluid and dries with it as compound. Preferably, the paper fleece 27 is also applied or rolled-on above the electric contacting means. A drying is preferably carried out in several stages, starting with a low temperature of approximately 60 to 100° C. and a final drying is carried out with a temperature of approximately 120 to 130° C.

Below the electric heating means, an optional covering or heat insulation layer 25 is arranged, which, for example, can consist of an electrical non-conductive fleece or fibre mat. In order to allow a good compound of the layers, the heat insulation layer can, for example, be adhered or glued and calendered. Of course, the structure of the heating means described above can also be provided with power via other or conventional contacting means, wherein the herein described contacting means are preferred.

In FIG. 2 a schematic cross-section view of a further embodiment of a covering panel 30 is shown. At the top side of the covering panel 30 three layers are schematically indicated. The upper-most layer consists of an overlay 36, for example, a paper, which is provided with a phenol resin and abrasion resistant particles, for example, corundum particles, serving as protection layer. The middle layer is a décor layer 31, like usually used with laminate panels in order to give the panels the look of real wood parquet. An upper core layer 32 is arranged below.

Figure 3:
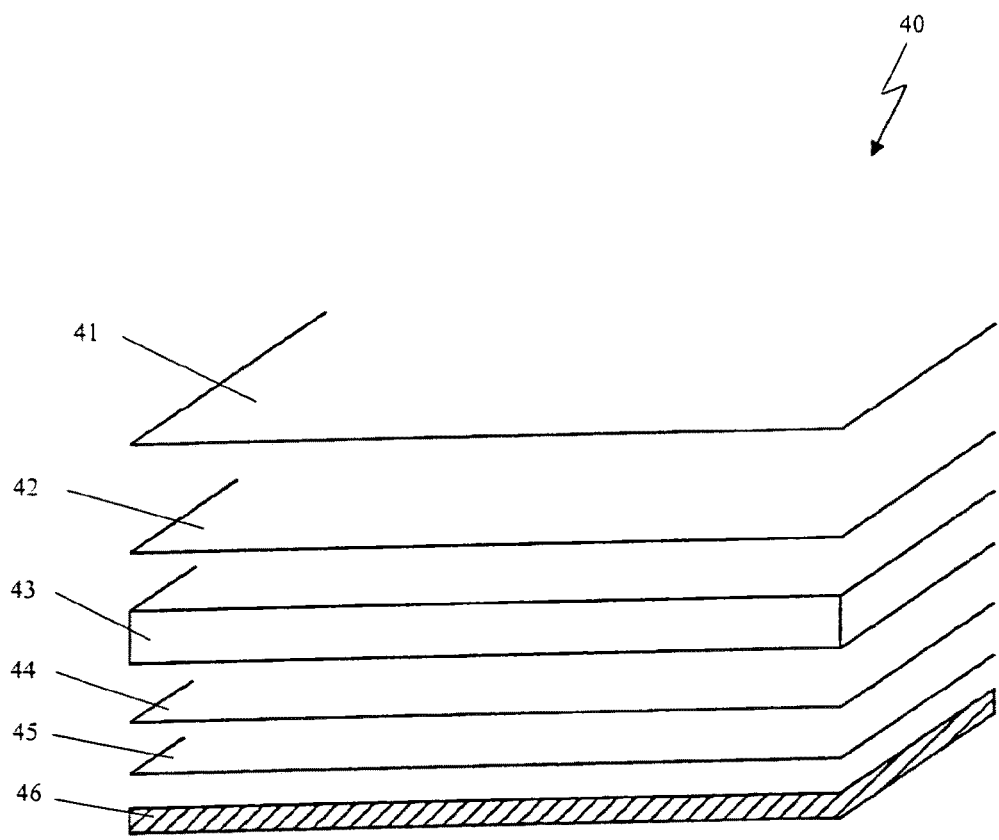
FIG. 3 is a schematic illustration of the layer structure of an embodiment of a covering panel.

Also at the bottom side of the covering panel 30 a layer system is arranged. The first layer at the bottom side of the covering panel 30 is a lower core layer 33. Below, a counter-strike paper 34 is arranged which should prevent a counter-strike of the laminate panel, i.e. of the covering panel 30. Below, a sound-absorbing layer 35, typically 0.3 mm thick, is arranged. The electric contacting means 15 and 20 extends partially over the bottom side of the covering panel 30 and rest partially onto the sound-absorbing layer 35. Below the sound-protective layer 35 again, an electric heating means in form of a panel heating is arranged. Also here, the panel heating consists of an electrical conductive layer 24 and a therein embedded paper fleece 27. In FIG. 3 it can be clearly seen, how the ends of the contacting means 15, 20 are in contact with the panel heating. Below the panel heating, similar as in FIG. 1, an optional heat-insulating layer 25 is arranged. For a person skilled in the art it is clear that all layers are tightly bounded with each other in order to build a covering panel with a thickness of a few millimeters.

In FIG. 3 the structure of a further laminate panel 40 is schematically shown. With reference sign 43 a carrier panel, for example made of HDF or MDF material, is characterised which builds the structure core of the laminate panel 40 as such. The upper-most layer is built by means of an overlay and a décor paper 41 respectively. Below a heating means in form of an electric panel heating 42 is arranged, like above described, an electrical conductive layer comprising a therein embedded paper fleece, i.e. between HDF-carrier panel and the overlay and décor paper 41 respectively. Below the carrier panel 43 a core layer made of natron paper 44 is arranged. Below, again, a counter-strike paper 45 and below a sound-absorbing layer 46 are arranged. As clear for a person skilled in the art, the electric contacting means are able to electrically connect such a laminate panel at which the heating means 42 are arranged at the top side of the panel. For this purpose, the contacting means, like shown in FIG. 1, are extended further to the top side of the covering panel so that they are in contact with the heating means. However, in this case, it is not necessary that the contacting means extends to the bottom side of the covering panel.

Figure 4:
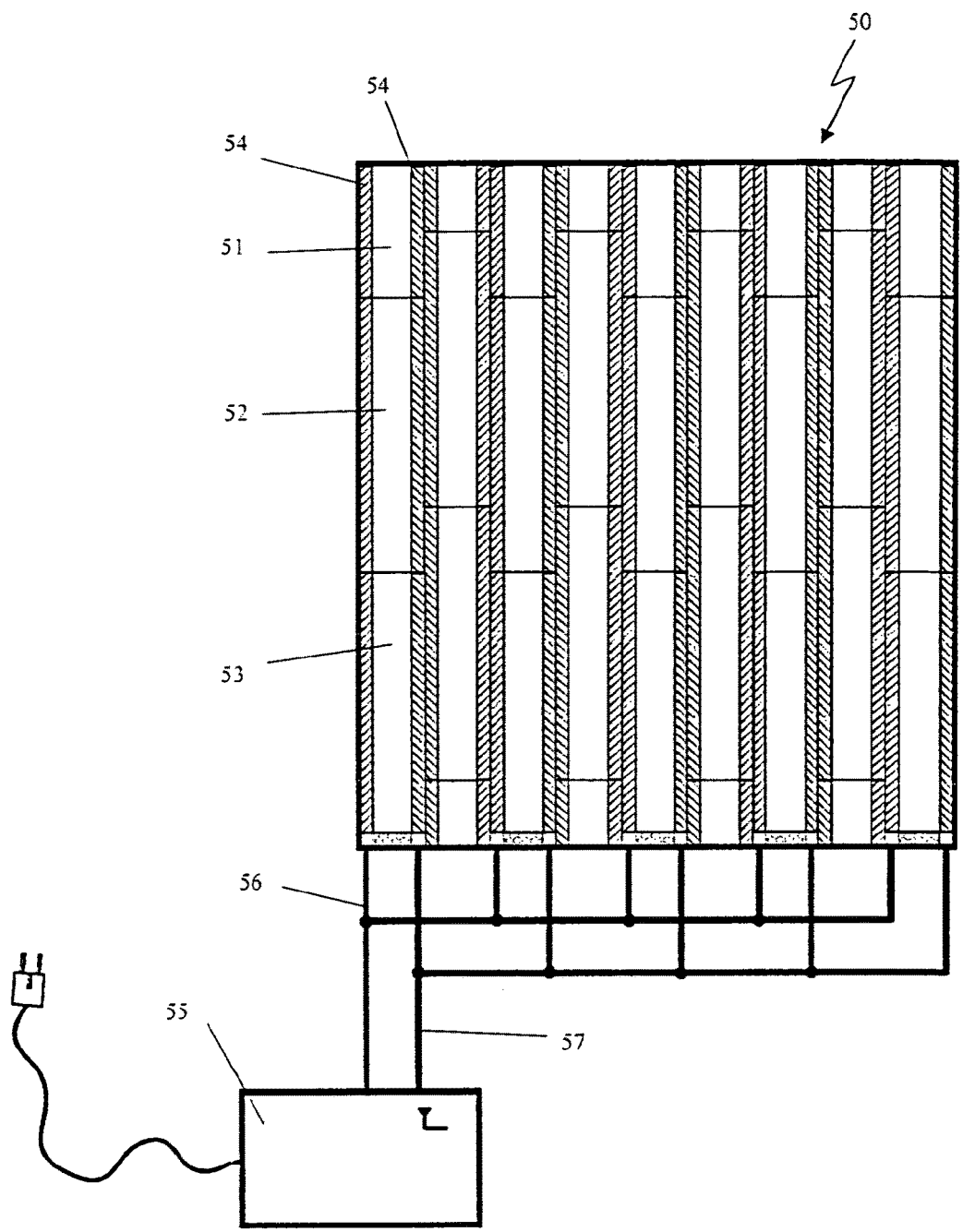
FIG. 4 is a schematic illustration of a covering system.
Figure 5:
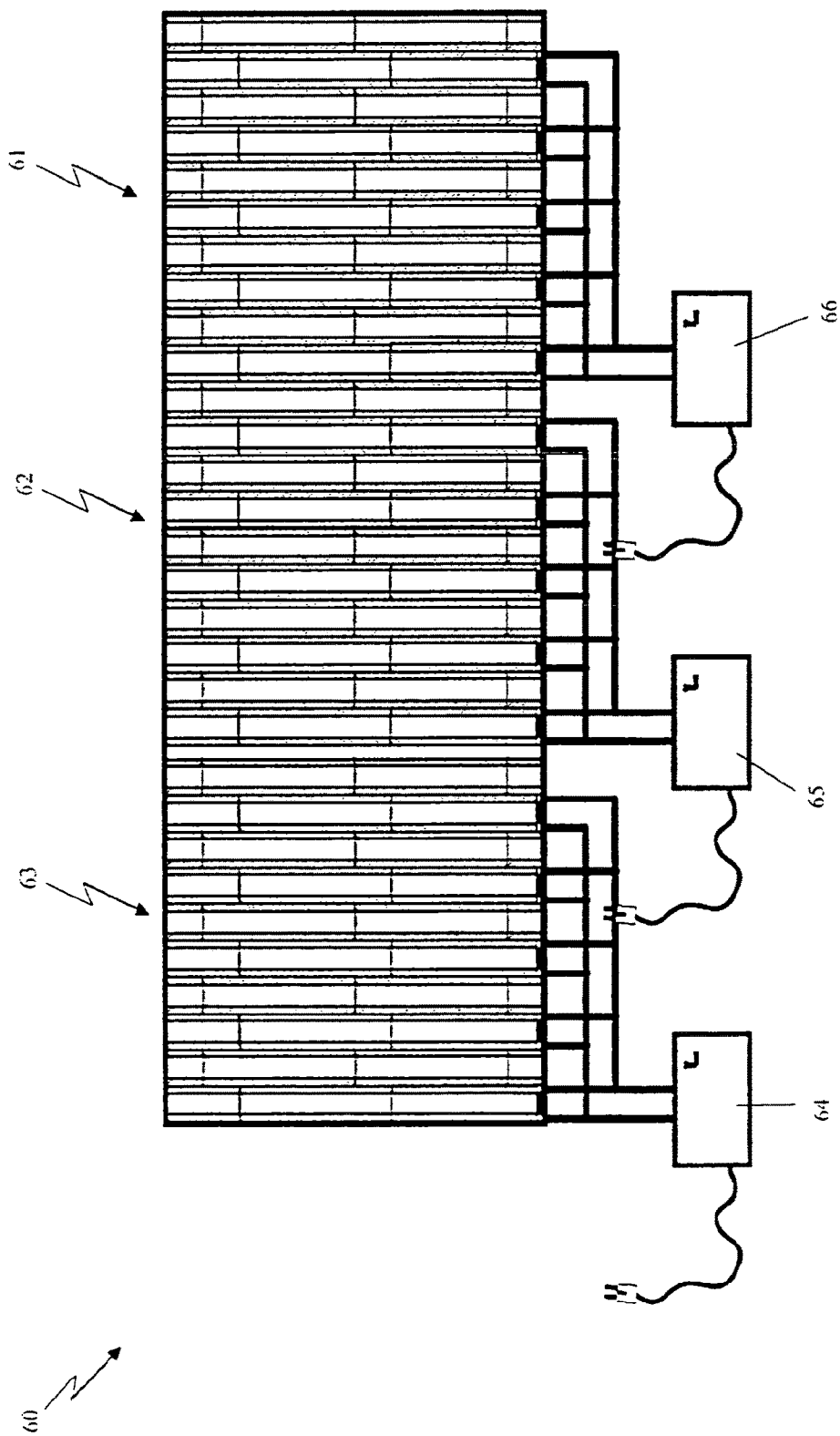
FIG. 5 is a further schematic illustration of a covering system.

In FIG. 4 a heatable covering system 50 is schematically shown. The covering system 50 consists of a number of covering panels, for example the covering panels 51, 52, and 53. As shown in FIG. 5, the covering panels are provided with electric contacting means 54 at their edges which essentially extends over the total longitudinal sides of the covering panels. As can be seen clearly, some of the covering panels are shorter as others. In order to adapt the covering system in its shape to the respective occurrences, for example, a room in which the covering system should be laid. Since the electric contacting means extends over the total longitudinal side of the covering panel, the covering panels can simply cut without that this has negative effects to the electric connectability of the panels. Moreover, the enforcement layer embedded in the electrical conductive layer prevents that the electrical conductive layer flakes or comes of while cutting. With reference sign 55 an electric module is indicated which provides the electric power supply for the heatable covering system 50 via electrical circuitry 56 and 57. Such an inventive covering system has, among others, the advantage that it can be also laid by a layman due to the simple electrical connectability of the electrical heating means.

In FIG. 5 a covering system 60 is illustrated which consists of a number of three separated covering systems 61, 62, and 63 which each has an own power supply 64, 65 and 66 respectively. The modular structure of the covering system 60 allows the use of more smaller power supply devices 64, 65, 66 instead of a single large device. In this manner, insulating transformers with a power of typical several 100 W, for example 700 W, can be used which can be connected and installed, respectively, also by a layman without particular qualification. At a typical area power of several 10 W per m$^2$ up to about 100 W per m$^2$ an area of 10 m$^2$ can be supplied by means of such small transformers. Furthermore, the power supply devices can be provided with a remote control and/or with temperature sensors in order to simplify the operating and the handling of the heatable covering system.

Figure 6:
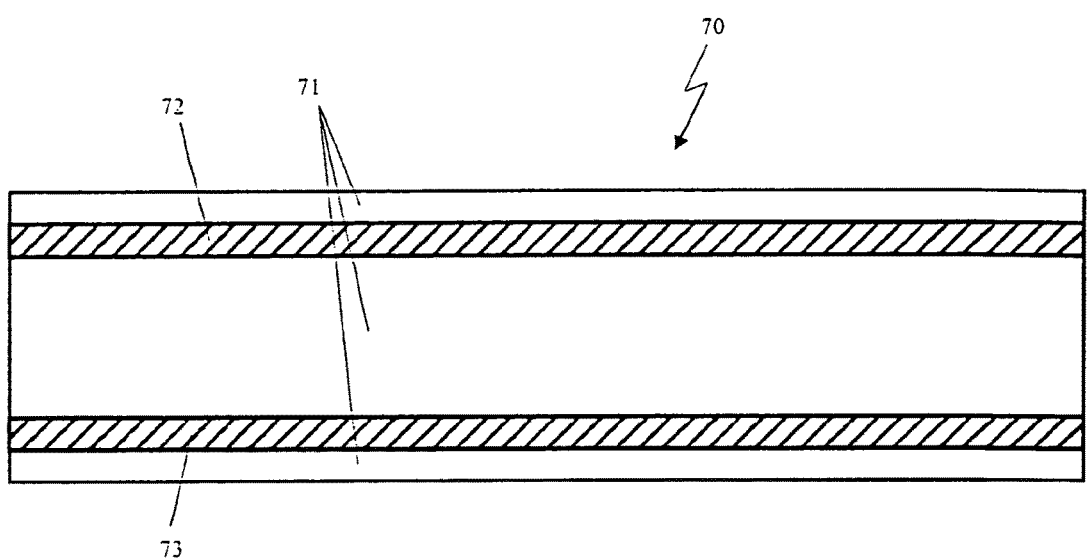
FIG. 6 is a schematic illustration of an alternative electric contacting means.

In FIG. 6 a schematic illustration of an alternative electric contacting means is shown. FIG. 6 shows schematically a covering panel 70, shown from its bottom side. The covering panel 70 is provided with an electrical panel heating 71 which is provided according to the above disclosed electrical heating means, therefore with an electrical panel heating 71 consisting of an electrical conductive layer of an electrically conductive graphite or carbon lacquer in which a paper fleece building the enforcement layer is embedded. On the panel heating 71 two electric contacting means 72 and 73 are arranged. The contacting means 72 and 73 consists of, for example, a thin conducting metal strip which is tightly connected with the electric panel heating 71, for example, glued. Thereby, the paper fleece can be arranged above the contacting means 72 and 73 so that also the contacting means are embedded in the paper fleece or between the electrical conductive layer and the contacting means 72 and 73 wherein an electric contact between the electrical conductive layer and the contacting means 72 and 73 has to be ensured. Also in this alternative manner, the herein described electrical heating means can be supplied with power. However, for a person skilled in the art, it is clear that also further alternatives exist which cooperate with the electrical heating means.

In periods in which it is not heated, an alternating current system with very reduced power output or in an interval manner can be used, whereby corrosion effects due to humidity or galvanic potential differences in electrical conducting contacting means can be avoided. This form of preventive protection is particularly recommended while using direct current.

The mounting of the electric contacting means on the coupling means can be carried out in different manners. For example, contacting strips made of thin copper or aluminium or high quality steel can be used which are provided with an adhesive layer which preferably has electrical conducting characteristics. Thereby, at first the panel heating layer can be applied and subsequently the electric contacting means can be applied or contrariwise. As materials for the electric contacting means, for example, a conducting copper foil is suitable, for example, the "Conductor Copper Fuel Tape" VE1691 of the company D&M International, A-8451 Heimschuh. Further materials, for example, are available from the company 3M Electrical Products Division, Austin, Tex., USA, for example, the type 1183.

In an alternative way of production an electrical conducting thin foil, for example, a copper or aluminium or high grade steel with optionally an applicable surface coating is applied, for example, onto the bottom side of a laminate panel at the edge in longitudinal direction. Afterwards, that thin foil is pressed onto or around the coupling means. The pressing preferably happens in such a manner that no steps on the passage between the foil and panel surface appears. After that a panel heating element can be applied onto the bottom side of the panel wherein the panel heating element gets into contact with at least a part of the foil. The electrical contact between the foil and heating means can be improved by an additional pressing. In addition, the contacting strips can be tint or nickel coated.

The fluid building the electrical conductive layer can also be applied in form of an electrical conductive paste respectively colour or lacquer having appropriate viscosity and drying characteristics. What is decisive is that into the fluid, building the electrical conductive layer, an enforcement layer could be brought in, such that it is embedded in the hardened layer. For example, carbon or graphite pigments with a polymer matrix can be used. Since, such a heating layer itself is only a few micrometers thick, different thermal expansions between heating layer and the other layers are nearly irrelevant.

The invention claimed is:

1. A heatable covering system for floors, ceilings and walls, comprising:
    covering panels each having a decorative top side and a bottom side; wherein
    the decorative top side includes a décor layer having an appearance of real wood,
    the covering panels each have at longitudinal edges thereof corresponding couplings in order to be able to join the covering panels to each other,
    the covering panels each comprise an electric heater and electric contacts in order to be able to electrically connect the covering panels with each other,
    the electric heater comprises an electrically conductive dry layer formed by an electrically conductive fluid which is applied onto the covering panels as a liquid and then dried or hardened, and
    the covering panels further comprise at least one reinforcement layer wherein the at least one reinforcement layer is at least partially embedded in the electrically conductive dry layer.

2. The heatable covering system according to claim 1, wherein the electric contacts are at least partially arranged at the couplings so that by assembling together the couplings of adjacent panels an electrical connection between the covering panels is producible.

3. The heatable covering system according to claim 1, wherein the at least one reinforcement layer comprises cellulose fibres and/or cotton fibres having a weight per unit area between 10 and 600 $g/m^2$.

4. The heatable covering system according to claim 1, wherein the couplings comprise complementary groove and tongue elements, each panel having the groove element on one longitudinal side and the tongue element on an opposite longitudinal side.

5. The heatable covering system according to claim 1, wherein the electric contacts substantially extend over a full length of the couplings.

6. The heatable covering system according to claim 1, wherein the electric contacts are pressed and/or glued on the couplings and/or are attached to the couplings by adhesive tape.

7. The heatable covering system according to claim 1, wherein the couplings comprise complementary groove and tongue elements, and the electrical contacts comprise electrically conductive metal foils that cover at least partially an inner surface of a lower flank of the groove and at least partially a lower side of the tongue.

8. The heatable covering system according to claim 1, wherein the electrically conductive dry layer comprises graphite lacquer or carbon lacquer or of a mixture thereof, wherein the fluid used to form the electrically conductive dry layer after hardening comprises carbon or graphite particles, and/or the fluid comprises nano-scale electrical conductive particles or multi-walled-carbon-nano tubes in order to increase the electrical conductivity of the fluid and/or in order to make the fluid electrically conductive.

9. The heatable covering system according to claim 1, wherein the reinforcement layer has a suction effect or an osmosis effect at the fluid used to make the electrical conductive dry layer.

10. The heatable covering system according to claim 1, wherein the electric heater of each covering panel has a sheet resistance of 100 to 500 Ohm/quadrate.

11. The heatable covering system according to claim 1, wherein the bottom side of the covering panel is provided with a sound-absorbing layer arranged between the bottom side of the covering panel and the electric heater.

12. The heatable covering system according to claim 1, wherein the reinforcement layer was applied onto the still wet fluid in order to embed the reinforcement layer at least partially in the electrically conductive dry layer.

13. A method for producing a heatable covering system for floors, ceilings and walls, comprising the following steps:
    providing a covering panel having a decorative top side and a bottom side, the decorative top side including a décor layer having an appearance of real wood;
    providing an electrically conductive fluid;
    applying the fluid onto the bottom side of the covering panel by means of a casting coating, a spray coating, a coil coating, a roller coating, a doctor blade coating, a screen print coating or an inkjet coating, or a combination thereof, wherein between 10 to 350 g/m² fluid is applied onto the covering panel;

applying and rolling a reinforcement layer onto the still not hardened fluid; and drying the fluid at a temperature up to 130° C. to form an electrically conductive layer, with the reinforcement layer becoming irreversibly adhered to the electrically conductive layer, and wherein the reinforcement layer is at least partially embedded in the electrically conductive dry layer.

14. A heatable covering system for floors, ceilings and walls produced according to the method of claim 13.

15. The heatable covering system according to claim 1, wherein the covering panels are laminate panels, veneer panels or parquet panels.

16. The heatable covering system according to claim 1, wherein the reinforcement layer is a fleece, paper, web or a meshwork.

17. The method according to claim 13, wherein the covering panels are laminate panels, veneer panels or parquet panels.

18. The method according to claim 17, wherein the electrically conductive fluid comprises carbon or graphite particles or comprises nano-scaled electrical conductive particles or multi-walled-carbon-nano tubes.

19. The method according to claim 15, wherein the reinforcement layer is a fleece, paper, web or a meshwork.

20. The method according to claim 15, wherein the reinforcement layer is applied at a temperature between 15 to 85° C., and the reinforcement layer is applied with a speed between 10 and 250 m/min.

21. The method according to claim 13, comprising:

providing the covering panels at their longitudinal edges with corresponding couplings in order to be able to join the covering panels to each other, and providing electric contacts in order to be able to electrically connect the covering panels with each other, wherein the electric contacts extend over at least 60% of a length of the couplings.

22. The heatable covering system according to claim 1, wherein the electric contacts extend over at least 60% of a length of the couplings.

* * * * *